US009823152B2

(12) United States Patent
Haldorsen et al.

(10) Patent No.: US 9,823,152 B2
(45) Date of Patent: Nov. 21, 2017

(54) DIFFERENTIAL PRESSURE SENSOR ASSEMBLY

(71) Applicant: Siemens Aktiengesellschaft, München (DE)

(72) Inventors: Kjetil Haldorsen, Rubbestadneset (NO); Hans Knutsson, Stord (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 73 days.

(21) Appl. No.: 14/901,737

(22) PCT Filed: Jun. 4, 2014

(86) PCT No.: PCT/EP2014/061583
§ 371 (c)(1),
(2) Date: Dec. 29, 2015

(87) PCT Pub. No.: WO2015/003857
PCT Pub. Date: Jan. 15, 2015

(65) Prior Publication Data
US 2016/0370245 A1 Dec. 22, 2016

(30) Foreign Application Priority Data

Jul. 12, 2013 (EP) .................................... 13176343

(51) Int. Cl.
*G01L 19/14* (2006.01)
*G01L 19/06* (2006.01)

(52) U.S. Cl.
CPC ........ *G01L 19/147* (2013.01); *G01L 19/0618* (2013.01)

(58) Field of Classification Search
CPC ..... G01L 19/00; G01L 19/06; G01L 19/0618; G01L 19/14; G01L 19/147; G01L 13/00
See application file for complete search history.

(56) References Cited

U.S. PATENT DOCUMENTS 8,915,140 B2 * 12/2014 Romo .................. G01L 13/026
228/107
2008/0157987 A1 7/2008 Hedtke
(Continued)

FOREIGN PATENT DOCUMENTS

| JP | 2005308397 A | * | 11/2005 | ............. | G01L 19/06 |
| JP | 2005308397 A | | 11/2005 | | |
| JP | 2013064728 A | * | 4/2013 | ............. | G01L 19/14 |

OTHER PUBLICATIONS

Extended European Search Report dated Feb. 4, 2014.
(Continued)

*Primary Examiner* — Nguyen Ha
(74) *Attorney, Agent, or Firm* — Harness, Dickey & Pierce, P.L.C.

(57) ABSTRACT

A method of manufacturing a differential pressure sensor is provided. The method includes providing a housing of a differential pressure sensor and a cover. The cover is mounted to the housing so as to form a pressure chamber. The differential pressure sensor is configured such that in operation, a pressure to be measured is transmitted into the pressure chamber. The method further includes heating a sleeve, placing the heated sleeve around the cover and the housing and allowing the sleeve to cool.

24 Claims, 4 Drawing Sheets

(56) References Cited

U.S. PATENT DOCUMENTS

2010/0148982 A1     6/2010   Hedtke
2011/0058313 A1     3/2011   Hausler et al.

OTHER PUBLICATIONS

International Search Report PCT/ISA/210 for International Application No. PCT/EP2014/061583 dated Sep. 12, 2014.
Written Opinion of the International Searching Authority PCT/ISA/237 for International Application No. PCT/EP2014/061583 dated Sep. 12, 2014.

\* cited by examiner

FIG 2 ize: 15px;"># DIFFERENTIAL PRESSURE SENSOR ASSEMBLY

PRIORITY STATEMENT

This application is the national phase under 35 U.S.C. §371 of PCT International Application No. PCT/EP2014/061583 which has an International filing date of Jun. 4, 2014, which designated the United States of America and which claims priority to European patent application number EP13176343.5 filed Jul. 12, 2013, the entire contents of which are hereby incorporated herein by reference.

FIELD

The invention generally relates to a method of assembling a differential pressure sensor and/or to a differential pressure sensor assembly, in particular with applications in the oil and gas industry.

BACKGROUND

Differential pressure sensors have many applications in the oil and gas industry, in particular for the measurement of differential pressures in fluids produced from a well or in fluids that are to be injected into a well. Examples of such applications include a flow meter in which differential pressure is measured across a constriction, valves, such as choke valves in which a differential pressure is measured across the valve, or filters, wherein a differential pressure can be measured across the filter, for example to detect clogging or the like.

A differential pressure sensor generally has a first pressure inlet via which a first pressure to be measured is transmitted and a second pressure inlet via which a second pressure to be measured is transmitted. The differential pressure sensor then produces a signal that corresponds to the pressure difference between the first pressure and the second pressure. The pressure in the process fluid which is to be measured is generally transmitted via an intermediate working fluid (also termed fill fluid) to a sensor element. For transmitting the pressure from the pressure inlet to the intermediate working fluid, a membrane (e.g. isolating diaphragm) which separates the process fluid from the working fluid can be used. This way, it can be ensured that the working fluid has predefined properties and stays clear of contaminations.

A chamber may be formed around the membrane (isolating diaphragm) by mounting a cover to a housing of the differential pressure sensor. A problem is that the pressures to be measured are relatively high, so that a high force is applied to such cover from within the chamber, which pushes the cover away from the housing. Conventional mounting methods are not capable of achieving mounting forces that are able to withstand the pressure applied from within the pressure chamber. Providing additional mechanical support, for example by clamping, requires additional mounting steps and considerably slows down the assembly of such differential pressure sensor. Furthermore, such measures generally require a recalibration of the differential pressure sensor, since such additional clamping generally applies non-uniform forces to the covers, which is detected by the differential pressure sensor. Also, such configurations are relatively bulky, leading to an increased overall size of the differential pressure sensor.

It is thus desirable to provide a differential pressure sensor which is able to measure differential pressures at high absolute pressures, i.e. as a high pressure rating. Furthermore, it is desirable that such differential pressure sensor is relatively fast and simple to assemble and is relatively compact.

SUMMARY

Accordingly, the inventors have recognized that there is a need for obviating at least some of the drawbacks mentioned above and for providing an improved differential pressure sensor and assembling method.

The claims describe embodiments of the invention.

An embodiment of the invention provides a method of assembling a differential pressure sensor. The method comprises the steps of providing a housing of the differential pressure sensor and a cover. The cover is mounted to the housings so as to form a pressure chamber. The differential pressure sensor is configured such that in operation, a pressure to be measured is transmitted into the pressure chamber. The method further comprises the steps of heating a sleeve, placing the heated sleeve around the cover and the housing, and reducing the inner perimeter of the heated sleeve by allowing the sleeve to cool. The sleeve is sized such that after cooling, the sleeve applies a force to the cover which presses the cover against the housing of the differential pressure sensor.

A further embodiment of the present invention provides a differential pressure sensor assembly. The differential pressure sensor assembly comprises a housing, a cover mounted to the housing and a pressure chamber formed by the cover and the housing. The pressure chamber is adapted to receive, in operation, a pressure to be measured. The pressure sensor assembly further comprises a sleeve disposed around the cover and the housing, wherein the sleeve is sized such that it applies a force to the cover which presses the cover against the housing of the differential pressure sensor assembly.

BRIEF DESCRIPTION OF THE DRAWINGS

The foregoing and other features and advantages of the invention will become further apparent from the following detailed description read in conjunction with the accompanying drawings. In the drawings, like reference numerals refer to like elements.

DETAILED DESCRIPTION OF THE EXAMPLE EMBODIMENTS

An embodiment of the invention provides a method of assembling a differential pressure sensor. The method comprises the steps of providing a housing of the differential pressure sensor and a cover. The cover is mounted to the housings so as to form a pressure chamber. The differential pressure sensor is configured such that in operation, a pressure to be measured is transmitted into the pressure chamber. The method further comprises the steps of heating a sleeve, placing the heated sleeve around the cover and the housing, and reducing the inner perimeter of the heated sleeve by allowing the sleeve to cool. The sleeve is sized such that after cooling, the sleeve applies a force to the cover which presses the cover against the housing of the differential pressure sensor.

By way of such method, the assembly of the differential pressure sensor may be facilitated and accelerated. In particular, by using such method, a bolting of additional plates to the housing of the differential pressure sensor is no longer required, since forces required to maintain the integrity of the differential pressure sensor can be applied by the sleeve placed around the cover and the housing. A further advantage is that such sleeve can apply forces uniformly, so that after mounting the sleeve, a recalibration of the differential pressure sensor is generally not necessary. Also, since no bolted connections are required, the differential pressure sensor can be made more compact. When allowing the sleeve to cool, the temperature of the sleeve may be equalized to the temperature of the housing and the cover, e.g. may be equalized to the room temperature.

In an embodiment, the inner perimeter of the sleeve may for example be the circumference of the inner opening of the sleeve, e.g. of a circular opening, of a rectangular opening or any other type of opening. It may for example be the sum of the edge lengths of a rectangular opening. The opening or through hole in the sleeve may be shaped in dependence on the shape of the housing and the cover.

In an embodiment, the step of mounting a cover to the housing of the differential pressure sensor comprises mounting a first cover to the housing and mounting a second cover to the housing. The first and second covers are mounted on opposite sides of the housing. The second cover forms a second pressure chamber with the housing, the differential pressure sensor being configured such that in operation, a further pressure to be measured is transmitted into the second pressure chamber.

Accordingly, differential pressure may be measured between the pressures prevailing in the first pressure chamber and in the second pressure chamber. Further, placing the sleeve around the cover and the housing may comprise placing the sleeve around the first cover, the second cover and the housing. The sleeve can be sized such that after cooling, the sleeve applies a force to the first cover and a force to the second cover, the forces being such that both covers are pressed against the housing. Accordingly, with a single sleeve, both covers may be mounted to the housing with a high mechanical strength of the mount. Again, since the sleeve can apply forces uniformly, both covers can be mounted without requiring a recalibration of the differential pressure sensor.

In other embodiments, the first and second covers may be mounted to different positions on the housing of the differential pressure sensor. The sleeve may the only be provided around one of the covers. A further sleeve may be provided around the other cover, so as to press the other cover against the housing.

In an embodiment, the housing extends along an axis, and the first and the second covers are mounted to the housing at radially opposite sides of the axis. Placing the sleeve around the first cover, the second cover and the housing may comprise sliding the sleeve over the first and second covers and the housing along the direction of the axis. A relatively simple and fast assembly of the covers, the housing and the sleeve may thus be achieved.

In an embodiment, mounting the cover to the housing may comprise welding the cover to the housing. By welding, a fluid tight connection between the cover and the housing can be achieved. By way of the sleeve, additional mechanical strength is achieved, which can resist high hydraulic pressures applied from within the pressure chamber by the pressure bearing fluid. Such configuration may allow the use of the differential pressure sensor at high absolute pressures.

In an embodiment, the step of heating the sleeve comprises heating the sleeve to a temperature above 200° C., preferably above 300° C., more preferably above 340° C. As an example, the sleeve may be heated to 350° C. Using such temperature for heating the sleeve will provide a sufficient expansion of the sleeve, which facilitates assembly of the differential pressure sensor since such expansion of the sleeve may provide enough space for sliding the sleeve over the housing and the cover, in particular the housing and the first and second covers.

In an embodiment, the method may further comprise the step of cooling the cover and the housing before placing the sleeve around the cover and the housing. By cooling the cover (in particular the first and second covers) and the housing, a shrinking of the material of the cover and the housing due to the decreased temperature leads to a smaller size of cover and housing, again facilitating the sliding of the sleeve over the cover and the housing. Furthermore, the opening in the sleeve may be made smaller, which can lead to a higher force being applied to the cover after cooling of the sleeve and equalization of the temperature of cover and housing.

The cover and the housing may for example be cooled to a temperature below 0° C., preferably below −20° C. and more preferably below −35° C. As an example, the cover and the housing may be cooled to −40° C.

Note that any of the above outlined temperatures of heating the sleeve and cooling the cover and the housing can be combined with each other. As an example, the sleeve may be heated to about 350° C., while cover and housing may be cooled to about −40° C.

In an embodiment, the sleeve is sized such that after cooling, the sleeve applies a force to the cover that is at least equal to a hydraulic force which, in operation, is applied to the cover by the pressure inside the pressure chamber. This may be a hydraulic force that is applied to the cover at a pressure corresponding to the maximal absolute pressure rating of the differential pressure sensor.

Accordingly, the configuration of the sleeve can be adjusted to meet a particular pressure rating of the differential pressure sensor. As an example, for higher pressure ratings at which higher pressures can be present in the pressure chamber, higher hydraulic forces are applied to the cover and essentially push the cover away from the housing. Forces that press the cover against the housing can be applied by way of the sleeve, and the forces can be increased by providing a sleeve with a smaller inner opening of the sleeve. By selecting the appropriate temperatures for heating the sleeve and optionally cooling the cover and the housing, placing the sleeve around the cover and the housing becomes possible and after equalization of the temperatures, a high force will be applied by the sleeve to the cover.

A further embodiment of the present invention provides a differential pressure sensor assembly. The differential pressure sensor assembly comprises a housing, a cover mounted to the housing and a pressure chamber formed by the cover and the housing. The pressure chamber is adapted to receive, in operation, a pressure to be measured. The pressure sensor assembly further comprises a sleeve disposed around the cover and the housing, wherein the sleeve is sized such that it applies a force to the cover which presses the cover against the housing of the differential pressure sensor assembly.

With such differential pressure sensor assembly, advantages similar to the ones outlined further above with respect to embodiments of the method can be achieved.

In an embodiment, the differential pressure sensor assembly further comprises a second cover mounted to the housing, the first and the second covers being mounted on opposite sides of the housing. The second cover forms a second pressure chamber with the housing, and the differential pressure sensor assembly is configured such that in operation, a further pressure to be measured is transmitted into the second pressure chamber. The sleeve may be disposed around the first and the second covers and the housing. The sleeve is sized such that it applies a force to the first cover and a force to the second cover. The forces are such that the first and the second covers are pressed against the housing. In such configuration, the forces applied by the sleeve can counter the hydraulic forces which the pressure in the first and second pressure chambers applies to the first and second covers in operation. Furthermore, a compact differential pressure sensor assembly can be achieved, since the sleeve can apply the forces simultaneously to both covers. Also, the application of forces is rather uniform, which avoids that differential pressure measurements are influenced by forces that are unevenly applied to different positions of the housing of the differential pressure sensor assembly.

In an embodiment, the sleeve is a ring. By using a ring, a compact configuration of the differential pressure sensor assembly can be achieved.

In an embodiment, the sleeve is a metal sleeve. A metal sleeve has a relatively high mechanical strength and can apply high mechanical forces.

The sleeve may be made of a single piece. In particular, a single piece of material may be used for making the sleeve. As an example, the sleeve may be machined from a single metal piece.

The sleeve may be made out of 34CrNiMoS6. Such material provides a suitable expansion upon heating and furthermore is capable of applying suitable mechanical forces to the covers after cooling.

In an embodiment, the cover may comprise a flow channel via which a pressure inlet is connected to the pressure chamber. Again, this may be the same for the first and the second covers. Such configuration may reduce the complexity of the differential pressure sensor assembly, since the cover itself provides a passage for the pressure into the pressure chamber.

In an embodiment, the sleeve may be a ring which has an outer diameter of equal or less than 150 mm, preferably equal or less than 110 mm. The ring may have an axial dimension of about 20 mm to about 80 mm, preferably of about 40 mm to about 60 mm. As an example, the ring may have an outer diameter of 130 mm or 100 mm, and it may have an axial dimension (thickness) of about 50 mm.

In an embodiment, the sleeve may have a rectangularly shaped opening which has a first edge length and a second edge length. The first edge length may be within a range of about 45 mm to about 65 mm, and the second edge length may be within a range of about 55 mm to about 75 mm.

In an embodiment, the differential pressure sensor assembly is a subsea differential pressure sensor assembly. The subsea differential pressure sensor assembly may furthermore comprise a pressure resistant enclosure, with the differential pressure sensor, the housing, the cover and the sleeve being mounted inside the pressure resistant enclosure. Accordingly, protection from ambient pressure prevailing at a subsea location can be achieved when the differential pressure sensor assembly is installed subsea.

In an embodiment, the differential pressure sensor assembly is adapted to measure a differential pressure in a flow of fluid produced from or injected into a subsea well. As an example, first and second pressure inlets via which pressure is transmitted into the first and second pressure chambers can be connected to different positions of a duct or a pipe of such subsea production system, which duct or pipe may for example be located on a subsea Christmas tree. The subsea differential pressure sensor assembly may be configured to measure differential pressure across a flow constriction, a valve, a filter or the like.

The differential pressure sensor and/or the differential pressure sensor assembly may have a first pressure inlet and a second pressure inlet, between which the differential pressure may be measured.

The sleeve may be a metal disc having a through hole in which the cover and the housing are partly disposed. The through hole may be machined into the metal disc. The through hole may have a rectangular, circular or oval cross section. The shape of the through hole may be adapted to the shape of the cover (or both covers). Pressure may thus be applied effectively by the sleeve to the covers.

It is to be understood that the features mentioned above and those yet to be explained below can be used not only in the respective combinations indicated, but also in other combinations or in isolation, without leaving the scope of the present invention.

In particular, the method may be performed by using a differential pressure sensor assembly according to any of the above outlined embodiments. Similarly, the differential pressure sensor assembly may in embodiments be configured so as to embody any of the above outlined method steps.

In the following, embodiments of the invention will be described in detail with reference to the accompanying drawings. It is to be understood that the following description of the embodiments is given only for the purpose of illustration and is not to be taken in a limiting sense. The drawings are to be regarded as being schematic representations only, and elements in the drawings are not necessarily to scale with each other. Rather, the representation of the various elements is chosen such that their function and general purpose become apparent to a person skilled in the art.

Figure 1:
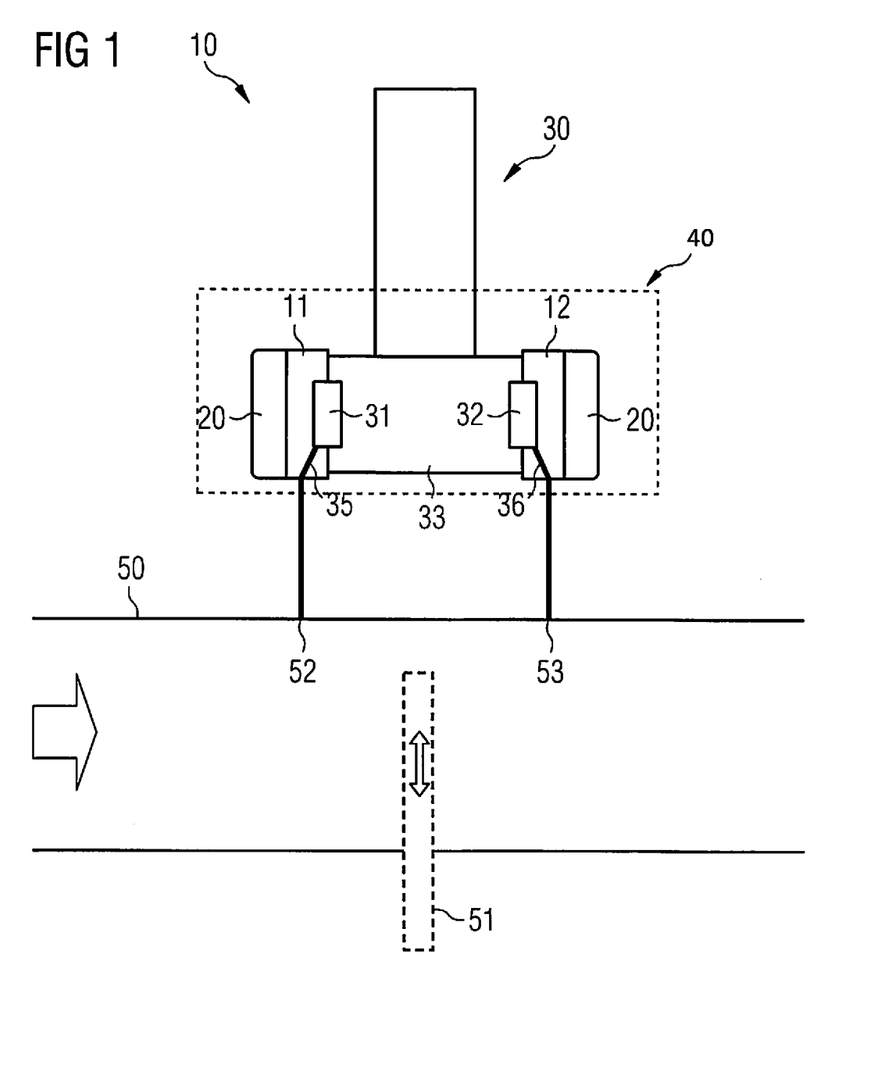
FIG. 1 is a schematic diagram showing a differential pressure sensor assembly according to an embodiment of the invention.

FIG. 1 is a schematic drawing showing a sectional side view of a differential pressure sensor assembly 10. The differential pressure sensor assembly 10 includes a housing 33 of the differential pressure sensor 30 towards which the first and second covers 11 and 12 are mounted. The covers 11 and 12 may also be termed process covers or pressure lids. The housing 33 and the covers 11 and 12 are made from metal. The process covers 11 and 12 may for example be made from Inconel 625. Preferably, covers 11 and 12 are welded to the housing 33. As can be seen in the sectional view of FIG. 1, a first pressure chamber 31 and a second pressure chamber 32 are formed between the respective covers 11 and 12 and the housing 33.

Note that in FIG. 1, the pressure chambers 31 and 32 are only schematically illustrated and may in particular implementations of the differential pressure sensor assembly 10 have rather different shapes. Isolating diaphragms of the differential pressure sensor 30 are positioned in the pressure chambers 31, 32 and transmit the pressure prevailing in the respective chamber to a working fluid (or fill fluid) inside the differential pressure sensor 30. The two working fluids apply the pressure to a sensor element which measures the difference between these pressures. The differential pressure sensor 30 thus measures a pressure difference between the pressure prevailing in the first and second pressure chambers 31, 32. Passages 35 and 36 are provided in the process covers 11 and 12, and by way of the passages, pressure is transmitted from pressure inlets (or pressure inputs) 52 and 53, respectively, into the pressure chambers 31 and 32.

FIG. 1 shows as an example only an application in which the differential pressure is measured in a duct or section of piping 15 across a valve 51. The first pressure inlet 52 is located on one side of well 51 and the second pressure inlet 53 is located on the other side of valve 51. The arrow indicates the direction of flow of a fluid, such as a fluid produced from a hydrocarbon well or a fluid that is to be injected into a hydrocarbon well, such as injection water. If valve 51 is partly or fully closed, the pressures will be different on the upstream and the downstream side of the valve. These different pressures are transmitted into the pressure chambers 31 and 32, and the differential pressure sensor 30 measures this pressure difference. Note that this is only one exemplary application of the differential pressure sensor assembly 10, other applications include differential pressure measurements across any type of flow restriction, for example for a flow meter application or for measuring the pressure drop across a filter, for flow velocity measurements or the like.

In the above mentioned applications in the oil and gas industry, in particular when measuring differential pressures in fluids produced from a subsea hydrocarbon well, relatively high pressures can be transmitted into the pressure chambers 31 and 32. Pressure chambers 31 and 32 may need to be rated to withstand pressures in excess of 500 bar, or even pressures in excess of 1,000 bar, e.g. up to 2,000 bar. Accordingly, significant hydraulic forces act on the process covers 11 and 12. These forces will push the process covers 11 and 12 away from the housing 33. The welding of the process covers 11 and 12 to housing 3 may not be strong enough to withstand these high hydraulic forces.

The differential pressure sensor assembly 10 illustrated in FIG. 1 thus further comprises a sleeve 20. In the following description, sleeve 20 is assumed to be implemented in form of a ring having a circular outer shape. Although embodiments of the invention are subsequently described with respect to a ring, it should be clear that sleeve 20 may be provided in other forms, e.g. with a rectangular outer shape or the like.

The ring 20 (circumferentially) extends around the housing 33 including the covers 11 and 12. The differential pressure sensor assembly 10 can include a subsea enclosure 40 including the housing 33, covers 11 and 12 and the ring 20. As FIG. 1 shows a sectional side view, sections of ring 20 can be seen to the left of cover 11 and to the right of cover 12. The ring 20 is shaped such that the dimensions of its inner opening are slightly smaller than the extension of housing 33 and covers 11 and 12 in the respective direction. Accordingly, if ring 20 is disposed around the covers 11 and 12 and housing 33, it will apply a compressive force to the covers 11 and 12 and the housing 33 which pushes covers 11 and 12 towards housing 33. In such configuration, covers 11 and 12 are pressed with significant force against housing 33, thereby increasing the mounting strength to housing 33.

In particular in a direction perpendicular to the plane in which covers 11 and 12 extend (i.e. in direction of their thickness), the extension of covers 11 and 12 and housing 33 is slightly larger than the inner diameter of ring 20 in the same direction. In particular, the size of the ring is chosen such that the force applied to the covers 11 and 12 by the ring 20 is at least equal to the maximum hydraulic load on covers 11 and 12 by the pressure inside the pressure chambers 31 and 32. The maximum pressure inside the pressure chambers 31 and 32 can be determined by the pressure rating of the differential pressure sensor 30. As an example, the load applied by ring 20 may correspond to a pressure of more than 500 bar, more than 1,000 bar, e.g. a pressure up to 2,000 bar.

The differential pressure sensor assembly 10 may in particular be a subsea differential pressure sensor assembly. As shown in FIG. 1, it may accordingly further comprise a subsea subsea pressure resistant enclosure 40, in which the differential pressure sensor 30 and the ring 20 are disposed in the differential pressure sensor assembly 10. The subsea enclosure 40 includes at least the housing 33, covers 11 and 12 and the ring 20, arranged inside the subsea enclosure 40.

Figure 2:
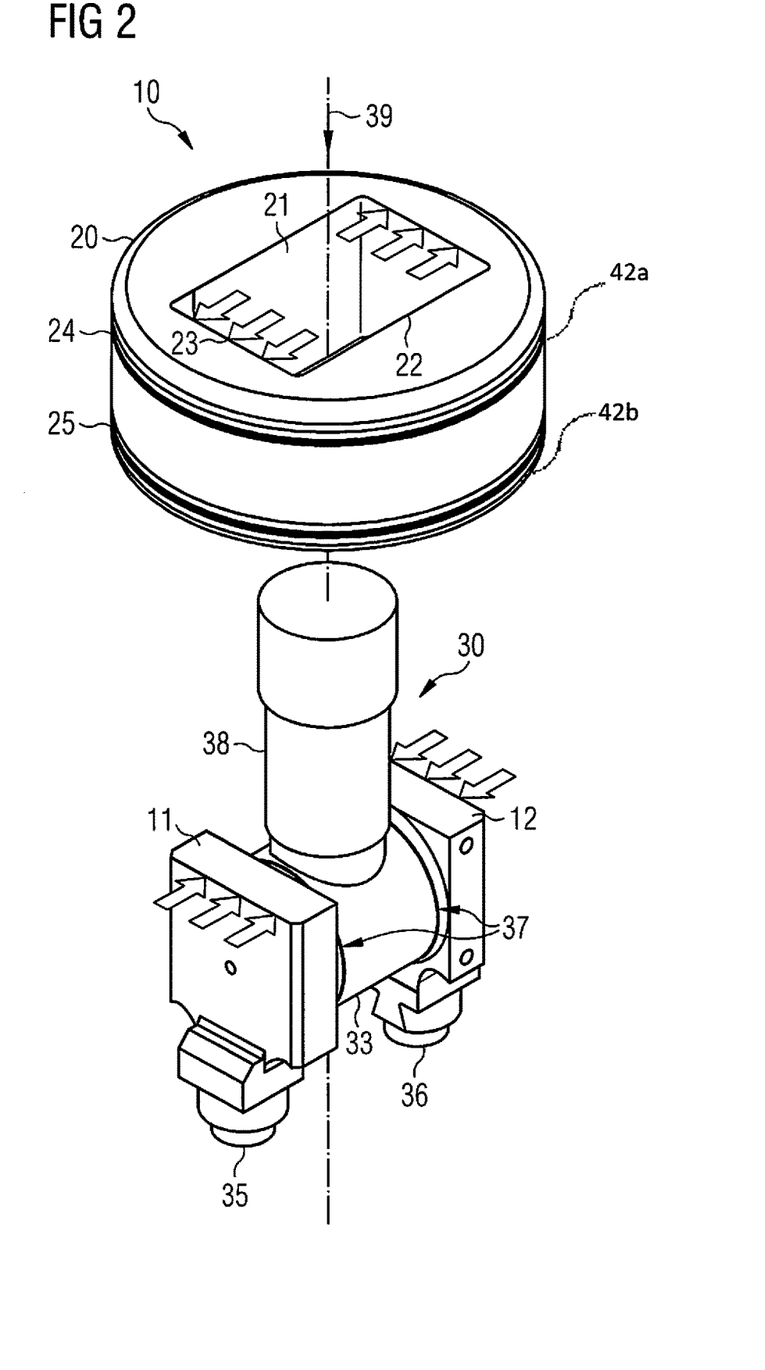
FIG. 2 is a schematic diagram showing a perspective view of a differential pressure sensor assembly according to an embodiment of the invention during assembly.

FIG. 2 shows a perspective view of a particular implementation of the differential pressure sensor assembly 10 of FIG. 1, before assembly of the ring 20. Accordingly, all explanations given above with respect to FIG. 1 equally apply to the differential pressure sensor assembly 10 of FIG. 2. In FIG. 2, the state before placing the ring 20 around the covers 11 and 12 and the housing 33 is illustrated. As can be seen, the covers 11 and 12 are welded to the housing 33 by the weld 37. Weld 37 may in particular be an electron beam weld.

Differential pressure sensor 30 has a differential pressure cell 38 which may for example comprise the sensor element for measuring the differential pressure between the pressures applied via passages 35 and 36.

As can be seen, the housing 33 of the differential pressure sensor 30 extends along an axis 39. The covers 11 and 12 are mounted on radially opposite sides of the axis 39 to the housing 33. When placing ring 20 around the covers 11 and 12 and the housing 33, the ring is slid down along the axis 39 as indicated by the arrow.

Ring 20 has an outer circular shape. The inner opening 21 of ring 20 has in the embodiment of FIG. 2 a rectangular shape. As explained above, the length of the edge 22 of the rectangular opening 21 in the ring 20 is slightly smaller than the lateral extension of covers 11 and 12 and housing 33 perpendicular to axis 39. In the normal state of ring 20, covers 11 and 12 and housing 33 (i.e. at room temperature), it is accordingly not possible to place the ring 20 over the covers 11 and 12.

For positioning ring 20 around the covers 11 and 12, ring 20 is thus heated, preferably to a temperature above 300° C., for example to 350° C. At the same time, the remaining parts of the differential pressure sensor assembly 10, in particular covers 11 and 12 and housing 33, are cooled, preferably to a temperature below −30° C. The thermal expansion of ring 20 will lead to an increase in the length of edge 22, as indicated by arrows. At the same time, the size of covers 11 and 12 and housing 33 perpendicular to axis will decrease due to the cooling. Accordingly, in such state, the ring 20 can be slid over the covers 11 and 12 and housing 33 and can be positioned around the covers. Upon equalization of the temperatures, i.e. upon the temperature of ring 20 and of covers 11 and 12 and housing 33 reaching room temperature (or ambient temperature), these elements will return to their original size. Thereby, the ring 20 will shrink and will apply a significant force to the covers 11 and 12 which press the covers 11 and 12 against housing 33, as indicated by arrows.

The mounting strength of covers 11 and 12 to housing 33 can thus be increased significantly.

Ring 20 is preferably a metal ring. It may for example be made out of 34CrNiMoS6, i.e. of SS2541. Such type of material will allow a significant load to be applied to the ring 20, and thus the application of a significant force by ring 20 to the covers 11 and 12. This force may correspond to a pressure up to or even in excess of 1,000 bar. Furthermore, the ring 20 may be relatively compact, thus leading to a compact size of the differential pressure sensor assembly 10.

In an example configuration, ring 20 may have outer diameter of less than 150 mm, it may for example have an outer diameter of about 130 or about 100 mm. The length of edge 22 may for example lie within a range of about 55 to 75 mm, e.g. at about 65 mm. On the other hand, the length of edge 23 may lie within a range of about 45 to 65 mm, for example at about 55 mm. The thickness of ring 20, i.e. its axial extension along axis 39, may lie within a range of about 40 mm to about 60 mm, e.g. at about 50 mm. The covers and 12 may have a thickness, i.e. an extension perpendicular to the axis 39, of less than 20 mm, e.g. of about 15 mm or about 10 mm. With such dimensioning of the components of the differential pressure sensor assembly 10, a compact differential pressure sensor can be achieved.

The differential pressure sensor assembly 10 may in particular be a subsea differential pressure sensor assembly. It may accordingly further comprise a subsea pressure resistant enclosure, in which the differential pressure sensor 30 and the ring 20 are disposed. Such pressure resistant enclosure may maintain a predefined internal pressure, e.g. an internal pressure of below 5 bar, such as 1.5 or 1 bar, when the subsea differential pressure sensor assembly is installed at a subsea location, e.g. on the ocean floor.

The subsea enclosure may have a cylindrical shape. The ring 20 can be provided with groves 24 and 25. The inner diameter of the cylindrical subsea enclosure may be larger than the outer diameter of ring 20. Flexible elements 42a and 42b, such as O-rings, may be positioned in the grooves 24 and 25. The inner diameter of the cylindrical subsea enclosure may be dimensioned such that the flexible elements placed in grooves 24 and 25 are about their circumference in contact with the inner face of the cylindrical subsea enclosure.

Accordingly, via such flexible elements, the differential pressure sensor 30 including ring 20 can be mounted and suspended inside the subsea enclosure without having a fixed mechanical contact with the subsea enclosure. Differential pressure sensor 30 is thus mounted "floating" inside the subsea enclosure. This has the advantage that if a force is applied to the subsea enclosure, it is not directly transmitted to the differential pressure sensor 30. Differential pressure sensor 30 is relatively sensitive to such forces, since it can be configured to measure differential pressure in the range of millibar. Such floating mount can thus prevent that any forces applied to the subsea enclosure, e.g. forces introduced by external pressure, are picked up by the differential pressure sensor 30.

Figure 3:
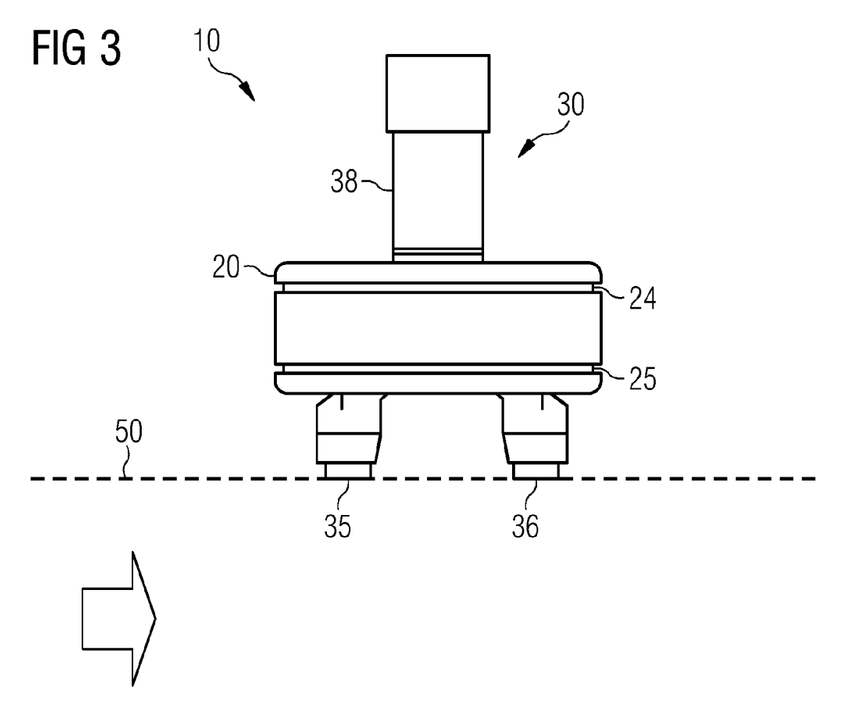
FIG. 3 is a schematic diagram showing a side view of a differential pressure sensor assembly according to an embodiment of the invention.

FIG. 3 is a schematic drawing of a side view of the differential pressure sensor assembly 10 in a state in which ring 20 is placed around the covers 11 and 12 and the housing 33. Accordingly, covers 11 and 12 are covered by the ring 20 and are thus not visible in FIG. 3. Groves 24 and 25 for positioning O-rings or other flexible elements around the ring 20 are visible. Pressure from within the duct or piping is transduced via passages 35 and 36 to the first and second pressure chambers (not shown in FIG. 3) to enable a differential pressure measurement by the differential pressure cell 38.

Figure 4:
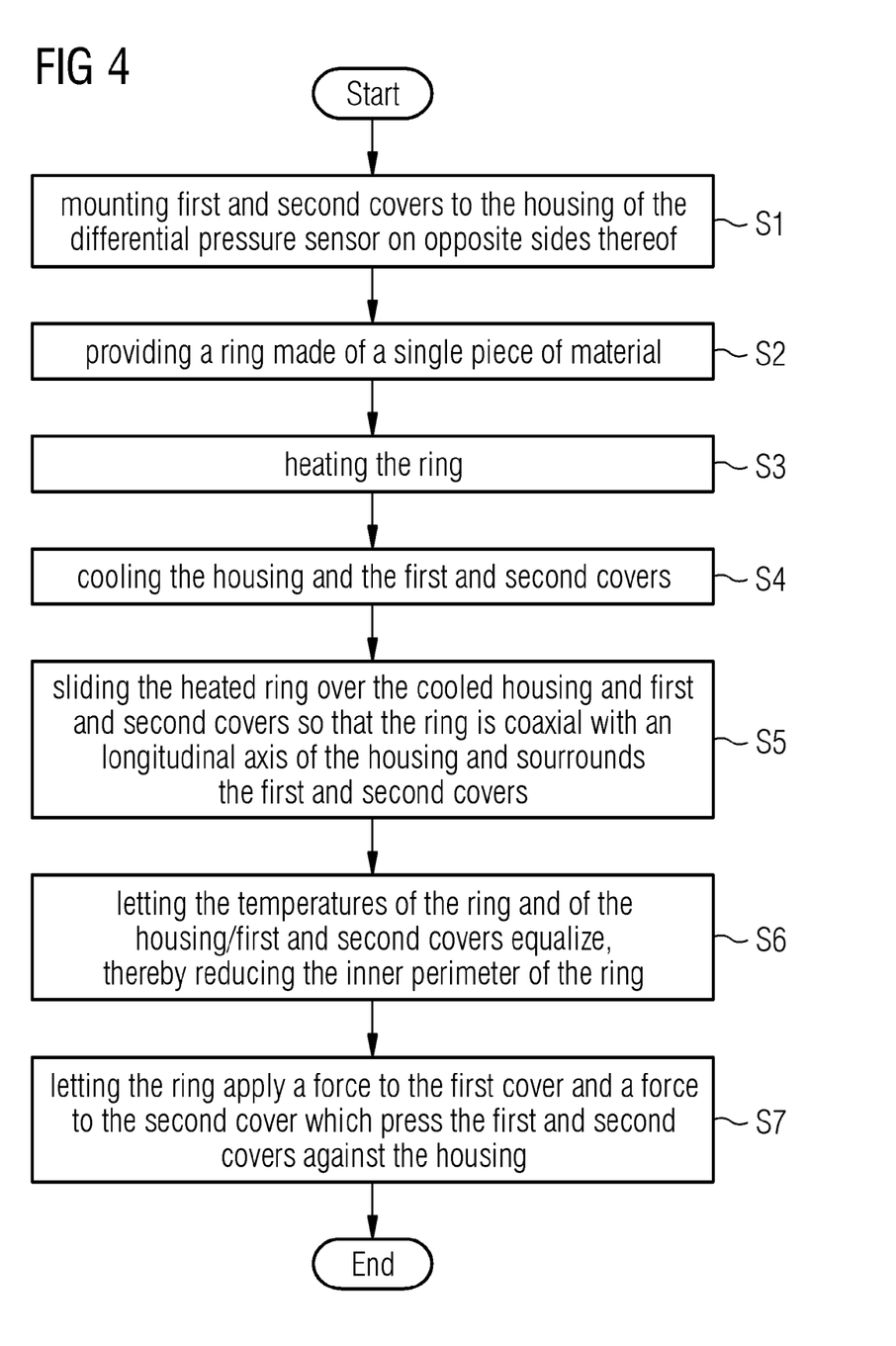
FIG. 4 is a flow diagram illustrating a method of assembling a differential pressure sensor according to an embodiment of the invention.

FIG. 4 shows a flow diagram of a method according to an embodiment of the invention. The method may be performed by the differential pressure sensor assembly 10 described with respect of any of FIGS. 1 to 3. The method of assembling a differential pressure sensor comprises in a first step S1 mounting first and second covers to the housing of the differential pressure sensor on opposite sides thereof. As outlined above, this may for example be performed by welding the covers 11 and 12 to the housing 33. In a next step S2, a ring made of a single piece of material is provided. Preferably, a single piece metal ring is provided.

In step S3, the ring is heated, e.g. to a temperature above 300° C. In step S4, the housing and the first and second covers are cooled, e.g. to a temperature below −30° C. The ring, the inner dimension of which is slightly smaller than the lateral extension of housing and first and second covers, can be slid over the cooled housing and the first and second covers, due to the expansion of the heated ring and the shrinking of the cooled first and second covers and housing. The ring is in step S5 placed around the first and second covers and the housing so that it surrounds the first and second covers and the housing and is coaxial with a longitudinal axis of the housing, e.g. with the axis 39 illustrated in FIG. 2.

In a step S6, the temperatures of the ring and of the housing and the first and second covers are allowed to equalize, i.e. they may again return to ambient temperature. Thereby, due to the cooling of the ring, the inner perimeter of the ring (i.e. the extension along the lengths 22 and 23 in FIG. 2) is reduced to its original size. Consequently, in step S7, the ring applies a force to the first cover and a force to the second cover. The forces are such that the first and second covers are pressed against the housing 33.

Such method of assembling a differential pressure sensor allows a relatively fast assembly with reduced complexity. As an example, the tightening of bolts with predefined torques is not required. Furthermore, by such assembly method, the forces applied to the covers are rather symmetrical, so that a recalibration of the differential pressure sensor is generally not necessary.

Additional steps that the assembly method may comprise include the placing of flexible rings, such as O-rings made of rubber, silicon or the like, around the ring 20, and of placing the differential pressure sensor including the ring 20 into a subsea enclosure which is sized such that, via the flexible rings, the differential pressure sensor is mounted floatingly inside the subsea enclosure. As mentioned above, such floating mount can prevent the transmission of external forces, e.g. by external pressure acting on the subsea enclosure, to the differential pressure sensor 30, which is sensitive enough to pick up such forces.

While specific embodiments are disclosed herein, various changes and modifications can be made without departing from the scope of the invention. The present embodiments are to be considered in all respects as illustrative and non-restrictive, and all changes coming within the meaning and equivalency range of the appended claims are intended to be embraced therein.

The invention claimed is:

1. A method of assembling a differential pressure sensor including a first pressure inlet and a second pressure inlet, the method comprising:
providing a housing of the differential pressure sensor and a cover;

mounting the cover to the housing so as to form a pressure chamber, the differential pressure sensor being configured such that in operation, a pressure to be measured is transmitted into the pressure chamber;

heating a sleeve;

placing the heated sleeve around the cover and the housing; and reducing an inner perimeter of the heated sleeve by allowing the sleeve to cool, wherein the sleeve is sized such that after cooling, the sleeve is configured to apply a force to the cover to press the cover against the housing of the differential pressure sensor.

2. The method of claim 1, wherein the mounting of the cover to the housing of the differential pressure sensor includes mounting a first cover to the housing and mounting a second cover to the housing on an opposite sides of the housing, the second cover forming a second pressure chamber with the housing, the differential pressure sensor being configured such that in operation, a further pressure to be measured is transmitted into the second pressure chamber, and wherein the placing of the sleeve around the cover and the housing comprises placing the sleeve around the first cover, the second cover and the housing, the sleeve being sized such that after cooling, the sleeve applies a force to the first cover and a force to the second cover which press both covers against the housing.

3. The method of claim 2, wherein the housing extends along an axis, and wherein the first and the second covers are mounted to the housing at radially opposite sides of the axis, and wherein placing the sleeve around the first cover, the second cover and the housing comprising sliding the sleeve over the first and second covers and the housing along the direction of the axis.

4. The method of claim 1, wherein the mounting of the cover to the housing comprises welding the cover to the housing.

5. The method of claim 2, wherein the mounting of the cover to the housing comprises welding the cover to the housing.

6. The method of claim 1, wherein the heating of the sleeve comprises heating the sleeve to a temperature above 200° C.

7. The method of claim 6, wherein the heating of the sleeve comprises heating the sleeve to a temperature above 300° C.

8. The method of claim 7, wherein the heating of the sleeve comprises heating the sleeve to a temperature above 340° C.

9. The method of claim 1, further comprising cooling the cover and the housing before placing the sleeve around the cover and the housing.

10. The method of claim 9, wherein the cooling of the cover and the housing comprises cooling the cover and the housing to a temperature below 0° C.

11. The method of claim 10, wherein the cooling of the cover and the housing comprises cooling the cover and the housing to a temperature below −20° C.

12. The method of claim 11, wherein the cooling of the cover and the housing comprises cooling the cover and the housing to a temperature below −35° C.

13. The method of claim 1, wherein the sleeve is sized such that after cooling, the sleeve is configured to apply a force to the cover that is at least equal to a hydraulic force which, in operation, is applied to the cover by the pressure inside the pressure chamber.

14. A differential pressure sensor assembly for measuring differential pressure between a first pressure inlet and a second pressure inlet, comprising:

a housing of a differential pressure sensor;

a cover mounted to the housing;

a pressure chamber formed by the cover and the housing, wherein the pressure chamber is adapted to receive, in operation, a pressure to be measured; and a sleeve, disposed around the cover and the housing, wherein the sleeve is sized to apply a force to the cover which presses the cover against the housing of the differential pressure sensor.

15. The differential pressure sensor assembly of claim 14, further comprising:

a second cover, mounted to the housing, the cover and second cover being mounted on opposite sides of the housing, the second cover forming a second pressure chamber with the housing, the differential pressure sensor being configured such that in operation, a further pressure to be measured is transmitted into the second pressure chamber, and wherein the sleeve is disposed around the cover and the second cover and the housing, the sleeve being sized to apply a force to the cover and a force to the second cover, which press the cover and the second cover against the housing.

16. The differential pressure sensor assembly of claim 14, wherein the sleeve is a metal sleeve.

17. The differential pressure sensor assembly of claim 15, wherein the sleeve is a metal sleeve.

18. The differential pressure sensor assembly of claim 14, wherein the sleeve is made of a single piece.

19. The differential pressure sensor assembly of claim 15, wherein the sleeve is made of a single piece.

20. The differential pressure sensor assembly of claim 14, wherein the sleeve is a metal disc having a through hole in which the cover and the housing are partly disposed.

21. The differential pressure sensor assembly of claim 14, wherein the cover comprises a passage via which a pressure inlet is connected to the pressure chamber.

22. The differential pressure sensor assembly of claim 14, wherein the differential pressure sensor assembly is a subsea differential pressure assembly and further comprises a subsea enclosure, the housing, the first and second covers and the sleeve being arranged inside the subsea enclosure.

23. The differential pressure sensor assembly of claim 22, wherein the sleeve includes an outer cylindrical face, wherein one groove is provided in the outer cylindrical face, the subsea differential pressure sensor assembly comprising a flexible ring provided in the groove, the subsea enclosure having an inner cylindrical face that is circumferentially in contact with the flexible ring provided in the groove so as to support the sleeve and the housing of the differential pressure sensor in the subsea enclosure.

24. The differential pressure sensor assembly of claim 23, wherein two or more grooves are provided in the outer cylindrical face, the subsea differential pressure sensor assembly comprising a flexible ring provided in each of the two or more grooves, the subsea enclosure having an inner cylindrical face that is circumferentially in contact with the flexible rings provided in the grooves so as to support the sleeve and the housing of the differential pressure sensor in the subsea enclosure.

* * * * *